Jan. 31, 1939.  A. C. ACCETTA  2,145,283
ARTIFICIAL LURE
Filed July 26, 1937
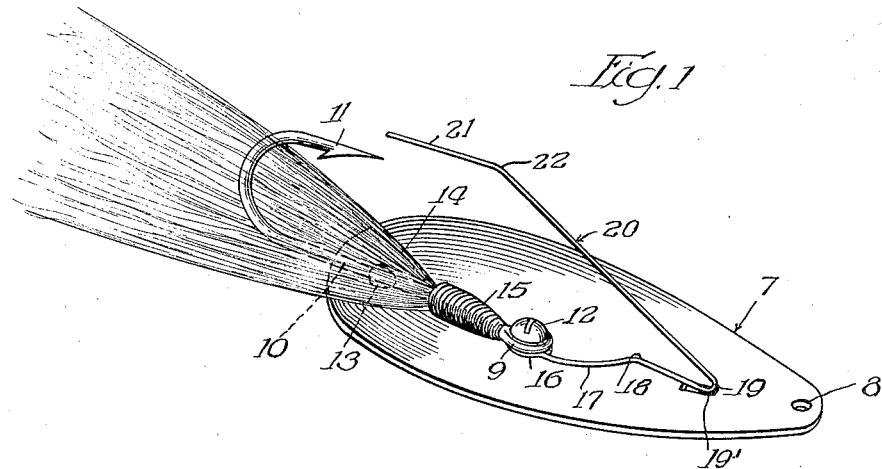
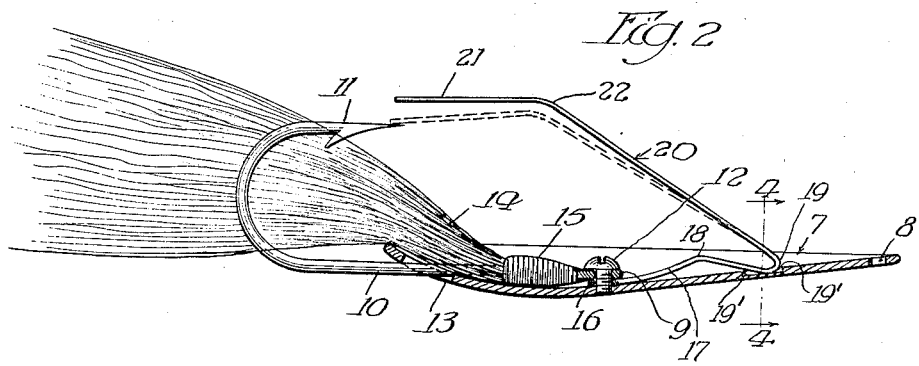
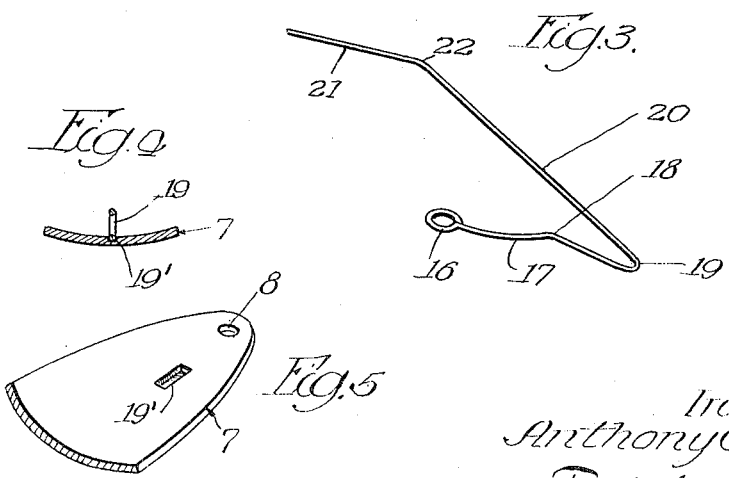
Inventor:
Anthony C. Accetta
By Fred Gerlach
his Atty.

Patented Jan. 31, 1939

2,145,283

UNITED STATES PATENT OFFICE 2,145,283

ARTIFICIAL LURE

Anthony Cesare Accetta, Cleveland, Ohio

Application July 26, 1937, Serial No. 155,602

4 Claims. (Cl. 43—39)

The invention relates to artificial lures.

One object of the invention is to provide a simple, efficient and durable weed-guard for a hook which is mounted on a spoon or body.

Another object of the invention is to provide an artificial lure with improved weed-guard for the hook.

The invention consists in the several novel features hereinafter set forth and more particularly defined by claims at the conclusion hereof.

In the drawing: Fig. 1 is a perspective of a lure embodying the invention. Fig. 2 is a longitudinal section. Fig. 3 is a perspective of the weed-guard. Fig. 4 is a section on line 4—4 of Fig. 2. Fig. 5 is a perspective of the front portion of the spoon.

The improved weed-guard is exemplified in connection with a lure comprising a spoon or body 7 which is dished or concave on its upper and convex on its lower faces and is provided with a hole 8 in its front end for connection to a swivel, spinner or line, as well understood in the art, and an upstanding fishhook having an eye 9, shank 10 and a point 11, and secured to the spoon by a screw 12 which passes through the eye of the hook and is threaded to the spoon. The front portion of the shank 10 lies over the dished top-face of the spoon. The shank extends through a slot 13 in the rear portion of the spoon. The lure may be provided with a bucktail, feathers or other means 14 secured at 15 to the shank of the hook and extending rearwardly to conceal the upstanding back-portion of the hook.

The improved weed-guard is formed of a single strip of spring-wire bent to form an eye 16 at one end which is adapted to be placed between the top-face of the spoon and the eye 9 of the hook, and is fixedly secured on the spoon by the screw 12 which extends through the eye 9 of the hook and secures the hook in the spoon. The guard comprises a member 17 which extends forwardly from eye 16 and longitudinally of the spoon, is arched as at 18, and terminates at its front end in an upward reverse curve or loop 19, and a resilient arm which extends longitudinally of the spoon and rearwardly and upwardly from the loop 19 and has portions 20, 21 which are angled vertically relatively to each other and joined by a bend or angle 22. The bend 19 at the front end of the guard extends into a recess 19' and seats in the top-face of the spoon. This recess holds the front end 19 and stabilizes the arm 20, 21 against transverse movement while permitting vertical flexing of the arm.

Normally the rear and free end of the trailing portion 21 of the arm is disposed above the bar 11 of the hook, as illustrated in Figs. 1 and 2. When the guard encounters a weed the inclined portion 20 will deflect the weed over the front of the spoon upwardly to the portion 21. When the guard is sharply flexed the arched portion 17 between bend 19 and eye 16 will be slightly flexed so that the wire will not break at the bend 19. In use, most of the weeds will be arrested by the guard and the rear end of member 21 will remain slightly above the point of the hook as indicated by dotted lines in Fig. 2. By having the portion 21 angled relatively to the front member 20 the weeds will be deflected over the hook. As the weeds pass over the bend 22 while the body is moving through the water the pressure of the weeds will be relaxed so that rear portion 21 will spring outwardly and effectively protect the point of the hook from the weeds. By providing a forwardly extending arched member 17 between the bend 19 and the eye 16 it becomes possible to make the members 20 and 21 of greater length for a more gradual deflection of, and for easy passage between, the weeds. It also permits the bend 19 to flex without sharp bending stresses which tend to snap the wire at said bend such as would result if the wire was sharply angled at the front end of the guard. It also permits flexing of the wire between the bend 19 and the eye. The forwardly extending member 19 also adapts the weed-guard for attachment to the spoon or body by the same screw which is used to secure the hook to the spoon or body. The recess 19' in the spoon, holds the looped front end 19 of the guard against transverse movement.

The invention exemplifies a weed-guard formed of a single strip of spring-wire which is simple in construction, efficient in operation; which is adapted to be readily applied to a lure comprising a body and an upstanding hook; which is adapted to be removably secured to the spoon by the same screw used for securing the hook to the spoon; which is simple and can be readily removed from the spoon or body for replacement or when it is desired to use the lure without the weed-guard; and which is formed so the guard will flex without likelihood of breakage of the wire.

The invention is not to be understood as restricted to the details set forth, since these may be modified within the scope of the appended claims, without departing from the spirit and scope of the invention.

Having thus described the invention, what I claim as new and desire to secure by Letters Patent is:

1. An artificial lure for fish comprising a body, an upstanding hook, and provided with an eye, a weed-guard for the hook formed of spring-wire and comprising an eye over the body, an upwardly arched member extending forwardly from the eye overlying the body and having its front end engaging the top-face of the body, and a resilient arm extending upwardly and rearwardly from the front end of said member, and means for removably securing the hook and the guard to the body.

2. An artificial lure for fish comprising a body, an upstanding hook secured to the body, a weed-guard for the hook formed of spring-wire and comprising an eye over the body, a member extending forwardly from the eye overlying the body and a resilient arm extending upwardly and rearwardly from the front end of said member, the body having means in its upper face in which the front end of the forwardly extending member of the guard is removably seated and held transversely, and means for removably securing the hook and the guard to the body.

3. An artificial lure for fish comprising a body, an upstanding hook secured to the body, a weed-guard for the hook formed of spring-wire and comprising an eye, an upwardly arched member extending forwardly from the eye and overlying the body, and a yieldable arm extending upwardly and rearwardly from, and connected to the front end of the member by a loop over the body, the body having a recess in its top-face with a closed bottom in which the looped front end is seated and held transversely, and means for removably securing the hook and the guard to the body.

4. An artificial lure for fish comprising a spoon having a concave upper face and a convex lower face, an upstanding hook having an eye at its front end, a weed-guard for the hook formed of spring-wire and comprising an eye, a member extending forwardly from the eye and a resilient arm extending upwardly and rearwardly from and connected by a loop to the front end of said member, the spoon having a recess in its convex face in which the front end of the member is seated and held transversely, and a screw extending through the eyes on the hook and the guard and removably securing the hook and guard to the spoon.

ANTHONY CESARE ACCETTA.